United States Patent [19]

Fukunaga

[11] Patent Number: 4,557,162

[45] Date of Patent: Dec. 10, 1985

[54] METHOD AND DEVICE FOR AUTOMATIC CONTROL OF TRANSMISSION

[75] Inventor: Takao Fukunaga, Hirakata, Japan

[73] Assignee: Kabushiki Kaisha Daikin Seisakusho, Osaka, Japan

[21] Appl. No.: 440,331

[22] Filed: Nov. 9, 1982

[30] Foreign Application Priority Data

Nov. 12, 1981 [JP] Japan ............................ 56-182139

[51] Int. Cl.$^4$ ............................................ B60K 41/18
[52] U.S. Cl. ........................................ 74/866; 74/861; 74/863
[58] Field of Search ................ 74/866, 863, 861, 857, 74/859, 843; 364/424.1

[56] References Cited

U.S. PATENT DOCUMENTS

| 3,759,344 | 9/1973  | Blee et al. | 74/866 X |
| 3,826,158 | 7/1974  | Flaig       | 74/866   |
| 3,903,759 | 9/1975  | Hashimoto   | 74/866   |
| 3,938,409 | 2/1976  | Uozumi      | 74/866   |
| 3,943,799 | 3/1976  | Sakai et al.| 74/866   |
| 4,223,573 | 9/1980  | Franssen    | 74/866 X |
| 4,274,306 | 6/1981  | Yokoi et al.| 74/866   |
| 4,294,341 | 10/1981 | Swart       | 74/866 X |
| 4,380,048 | 4/1983  | Kishi et al.| 74/866 X |

FOREIGN PATENT DOCUMENTS

| 2022732 | 12/1979 | United Kingdom | 74/866 |
| 1596358 | 8/1981  | United Kingdom | 74/866 |

Primary Examiner—Leslie A. Braun
Assistant Examiner—Joseph M. Rolnicki
Attorney, Agent, or Firm—Armstrong, Nikaido, Marmelstein & Kubovcik

[57] ABSTRACT

A method and a device for automatic control of a transmission, in a vehicle in which a power from an internal combustion engine is transmitted through a clutch and a staged geared-transmission to driven wheels, an idea speed ratio delivered from a speed ratio calculating circuit being converted into a stepped actual speed ratio by means of a comparator circuit common to both forward and backward movements, and an actual speed ratio appropriate for the forward movement being given in advancing the vehicle or that appropriate for the backward movement being given in retracting it by utilizing an advancing/reversing signal judging whether the vehicle is being advanced or retracted on that occasion.

8 Claims, 6 Drawing Figures

METHOD AND DEVICE FOR AUTOMATIC CONTROL OF TRANSMISSION

FIELD OF THE INVENTION

This invention relates to a method and a device for automatic control of a transmission, which automatically changes vehicle speed in both forward and backward directions, in a vehicle in which a power from an internal combustion engine is transmitted through a clutch and a staged geared-transmission to driven wheels.

Various types of automatic transmission systems have hitherto been proposed, however, automatic gear shift controlling methods and devices have not been devised, which enable automatic gear shift even in reversing a vehicle, provide a gear shift appropriate for the backward movement thereof in reversing it, and have a simple mechanism.

SUMMARY OF THE INVENTION

An object of this invention is to provide a method and a device which enable automatic gear shift even in reversing a vehicle, provide a gear shift appropriate for the backward movement thereof in retracting it, and have a simple mechanism.

In order to accomplish the above object, this invention is so devised that, in a vehicle where a power from an internal combustion engine is transmitted through a clutch and a staged geared-transmission to driven wheels, an ideal speed ratio delivered from a speed ratio calculating circuit is converted into a stepped actual speed ratio by means of a comparator circuit common to both forward and backward movements, and an actual speed ratio appropriate for the forward movement is given in advancing the vehicle or an actual speed ratio appropriate for the backward movement is given in reversing it by utilizing an advancing/retracting signal judging whether the vehicle is being advanced or reversing on that occasion.

DETAILED DESCRIPTION OF THE INVENTION

Figure 1:
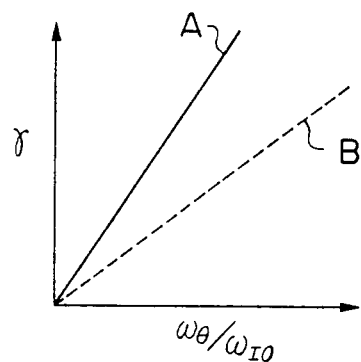
FIG. 1 is a relative diagram between a ratio $\omega_\theta/\omega_{IO}$ showing a conception of an ideal speed change and an ideal speed ratio $\gamma$.
Figure 2:
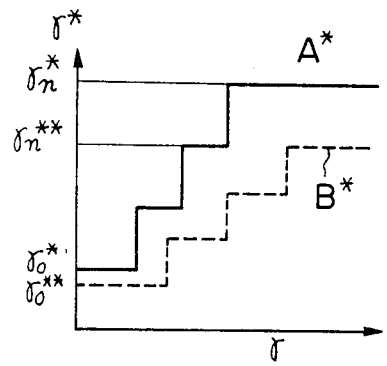
FIG. 2 is a relative diagram between the ideal speed ratio $\gamma$ and an actual speed ratio $\gamma^*$.

First, a desired engine rotational speed $\omega_{IO}$ in relation to an engine load (for ex. a stepped depth of an accelerator pedal) u is calculated. Then, a ratio of a vehicle speed (for ex. a rotational speed of a propeller shaft) $\omega_\theta$ to the desired engine rotational speed $\omega_{IO}$ i.e. $\omega_\theta/\omega_{IO}$ is calculated, thus the ideal speed ratio $\gamma$ to be desired being calculated. As shown in FIG. 1, for example, a relation between the ratio of the vehicle speed $\omega_\theta$ to the desired engine rotational speed $\omega_{IO}$ i.e. $\omega_\theta/\omega_{IO}$ and the ideal speed ratio $\gamma$ is determined as like the full line A in case of advancing the vehicle and the broken line B in case of retracting it. Further, the ideal speed ratio $\gamma$ is converted into the stepped actual speed ratio $\gamma^*$ ($\gamma_0^*$ to $\gamma_n^*$) corresponding to the actual gear ratio of the vehicle. As shown in FIG. 2, for example, a relation between the ideal speed ratio $\gamma$ and the actual speed ratio $\gamma^*$ is determined as like the full line A* in advancing the vehicle and as like the broken line B* in retracting the vehicle.

Figure 3:
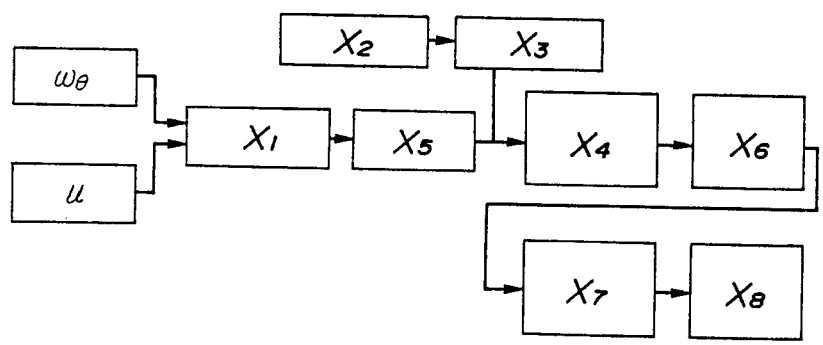
FIG. 3 is a block diagram showing a conception of the method and the device for automatic control of transmission in accordance with this invention.

FIG. 3 is a block diagram showing the conception of the method and the device for automatic control of transmission in accordance with this invention. The vehicle speed $\omega_\theta$ and the engine load u are fed in a speed ratio calculating circuit $X_1$ through an amplification circuit $X_5$ to a hysteresis-provided comparator circuit $X_4$ and to a current amplification circuit $X_6$. Then, they actuate a relay in a relay actuating circuit $X_7$ to be delivered to a hydraulic control system $X_8$, and the hydraulic control system actuates a power gear shifter (not shown in figure). Thus, an appropriate speed changing is performed automatically. On this occasion, an actual speed ratio appropriate for the forward movement is given in advancing the vehicle or an actual speed ratio appropriate for the backward movement is given in reversing it by means of the advancing/retracting signal (decided, for ex., by shifted position of a change lever) which judges whether the vehicle in a gear shift point setting circuit $X_3$ is being advanced or reversed.

Figure 4:
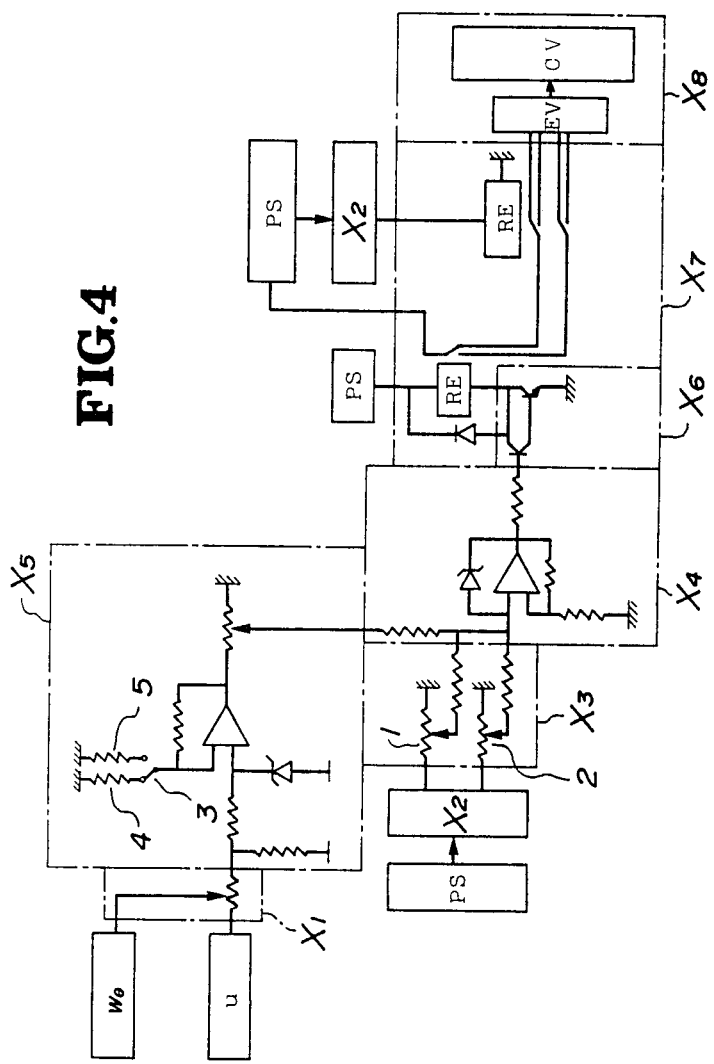
FIG. 4 is a circuit diagram showing a two-range gear shift among the methods and devices for automatic control of transmission in accordance with this invention.

FIG. 4 is a circuit diagram showing one two-range gear shift among the methods and devices for automatic control of transmission in accordance with this invention. The vehicle speed $\omega_\theta$ and the engine load (the stepped depth of the accelerator pedal) u are fed in the speed ratio calculating circuit $X_1$ through the amplification circuit $X_5$ to the hysteresis-provided comparator circuit (schmidt-trigger circuit) $X_4$ and to the current amplification circuit $X_6$. Then, they actuate a relay RE in the relay actuating circuit $X_7$ to be delivered to the hydraulic control system $X_8$, actuate the power gear shifter (not shown in the figure) through actuation of a control valve CV in the hydraulic control system $X_8$, thus performing an appropriate gear shift. Variable resistances for advancing and retracting 1 & 2 are provided in the gear shift point circuit $X_3$ which also functions as a power supply circuit to the schmidt-trigger circuit $X_4$. Voltage can be applied on the variable resistance for advancing 1 in advancing the vehicle or on the variable resistance for retracting 2 in retracting it depending on the advancing/retracting signal (decided, for example, by the shifted position of the change lever) so that, if resistance values of the variable resistances 1 & 2 can be determined adequately from the relations shown in FIG. 1 & FIG. 2, the input voltage (ideal speed ratio) $\gamma$ fed in the schmidt-trigger circuit $X_4$ can be delivered therefrom as a signal of shift point of the actual speed ratio $\gamma^*$. Incidentally, in the amplification circuit $X_5$ a mode select switch 3 is provided, which selects a mode for obtaining a maximum power or a mode for obtaining an economic power for the vehicle, and a resistance for max. power 4 and a resistance for economic power 5 are provided.

The output from the speed ratio calculating circuit $X_1$ according to the vehicle speed $\omega_\theta$ and the engine load u is amplified in the amplification circuit $X_5$ to be fed into the schmidt-trigger circuit $X_4$ as the ideal speed ratio γ. Gear shift becomes necessary when the speed ratio γ increases, and the gear shift point can be determined by values of the resistances 1 & 2 of the gear shift point setting circuit $X_3$. Consequently, the output from the circuit $X_4$ becomes 1 when the speed ratio γ (input voltage into the circuit $X_4$) is smaller than the gear shift point decided by determining the values of the resistances 1 & 2, and becomes 0 when the speed ratio γ is larger than the gear shift point. The hydraulic control system $X_8$ receives a voltage of 1 or 0 from the circuit $X_4$, and the control valve actuates through the means of an electromagnetic valve to perform gear shift. Incidentally, in FIG. 4 PS is the power supply and EV is the electromagnetic valve.

Figure 5:
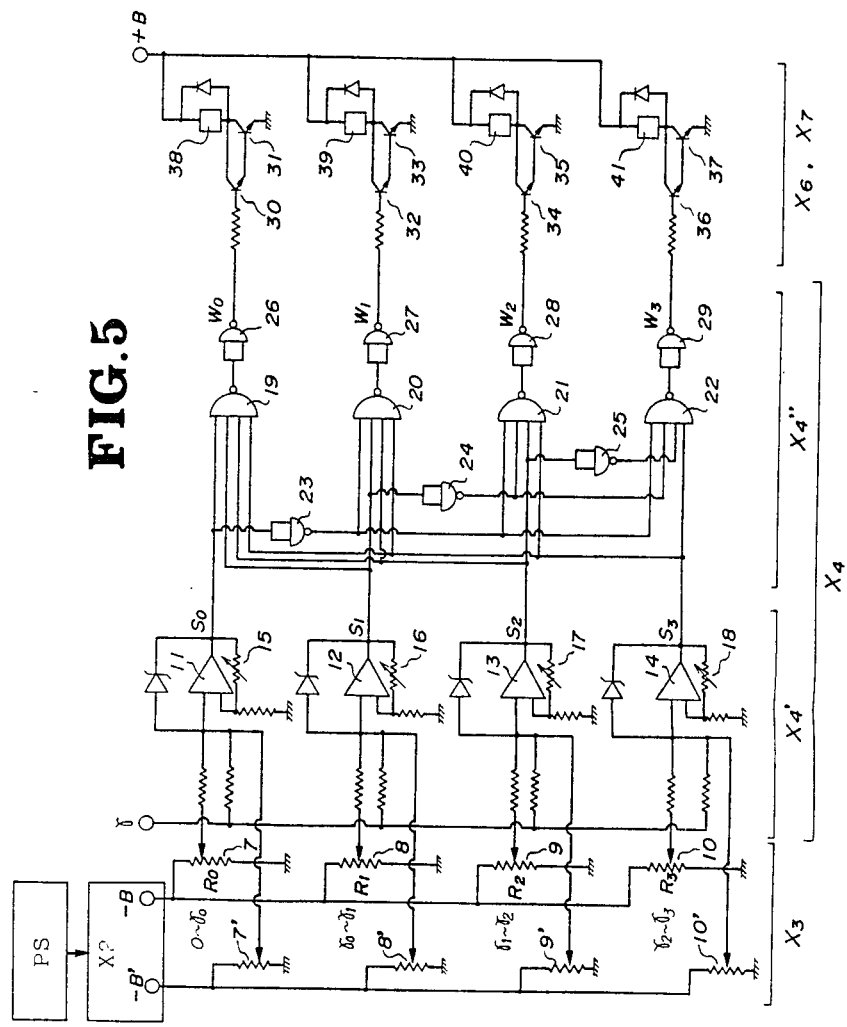
FIG. 5 is a circuit diagram of a multi-range gear shift.

A multi-range gear shift on which the pressent invention is applied will be described bereunder. In FIG. 5 showing the circuit digram of the method and the device for automatic control of a four-range gear shift transmission in accordance with this invention, this circuit comprises a conventional hysteresis-provided schmidt-trigger circuit $X_4'$, a comparator circuit $X_4$ consisting of a logical circuit $X_4'$, and relay actuating circuits $X_6$ & $X_7$ for a transmission operating relay (a member functioning as a shift lever in a general transmission) which responds to the actual speed ratio γ*. $X_3$ is the gear shift point setting circuit. The circuit shown in FIG. 5 will be described hereunder.

In case when, for example, the speed ratio γ is shifted from 0 to $γ_0^*$ ... $γ_3^*$ in advancing a vehicle; an electric current flows from −B to make an output of an operational amplifier 11 into 1 and also outputs of other operational amplifiers into 1 (because of all outputs of the four schmidt-trigger circuits being 1), when a vehicle is in stopped condition, through functions of variable resistances for advancing 7, 8, 9, & 10 utilized for the gear shift point setting circuit $X_3$ in FIG. 5.

Now, consider the case that the vehicle makes a start from the stopped condition. An output 1 of the operational amplifier 11 at the topmost circuit in FIG. 5 passes through the logical NAND circuit 19 and the NAND circuit 26 to make the output $W_01$, and actuates the relay 38 corresponding to the first position through functions of current amplification circuits in transistors 30 & 31. The actuation of the relay 38 causes practical operation of the transmission.

Considering an amplifier other than the operational amplifier 11, for example the amplifier 12, in case when a functioning signal is given to the relay 48; an output of the amplifier 12 is 1 and an input of the NAND circuit 20 depends upon outputs of the amplifiers 12, 13, & 14 and an output passing from the amplifier 11 through the NAND circuit 23 (inputs into the NAND circuit 20 are 0, 1, 1, 1). Consequently, an output of the NAND circuit 20 is 1, and an output of the NAND circuit 27 is 0, i.e. the output $W_1$ is 0. Similarly, the outputs $W_2$ and $W_3$ are both 0, so that the relays 39, 40, & 41 responding to the second position, the third position, and the fourth position respectively do not function.

When, in the next step, an input voltage γ in the schmidt-trigger circuit $X_4'$ increases as the vehicle speed increases to get as high as a previously prescribed voltage (designated as a threshold voltage which is to be predetermined on every actual speed ratio γ*); the output of the amplifier 11, which has hitherto been 1, becomes 0 and therefore turns the first-position relay 38 to OFF through the NAND circuits 19 & 26, and simultaneously the output of the NAND circuit 27 becomes 1 to cause actuation of the second-position relay 39 because the input side of the NAND circuit 20 is fed informations through the NAND circuit 23.

Namely, all the outputs of amplifiers are 1 at starting. First, the first-position relay 38 turns to ON. Then, as the vehicle speed increases, the output of the amplifier 11 becomes 0, and the relay 38 turns to OFF simultaneously with the second-position relay 39 turning to ON. Further, with an increase in the vehicle speed, the output of the amplifier 12 becomes 0, the second-position relay 39 turns to OFF, and the relay 40 turns to ON. As mentioned above, the gear shift is performed to a higher range in regular sequence.

In the next case when the speed ratio γ is shifted from 0 to $γ_0^{}$ ... $γ_3^{}$ in advancing a vehicle, an electric current flows not to −B but to −B′ caused by the advancing/retracting signal. Variable resistances for retracting 7′, 8′, 9′, & 10′ have been prescribed to values for retracting the vehicle similarly to the case of advancing it. As these resistances 7′, 8′, 9′, & 10′ determine the threshold voltage of the schmidt-trigger circuit $X_4'$, the actual speed ratio γ** appropriate for retracting the vehicle can be determined corresponding to the speed ratio γ.

Incidentally, it is desirable to provide a hysteresis difference between up-shifting and down-shifting operations in gear shift with an adequate width producing some chattering and matching with actual driving conditions of a vehicle, and these values are freely adjustable by means of variable resistances 15, 16, 17, & 18 in the operational amplifiers.

Figure 6:
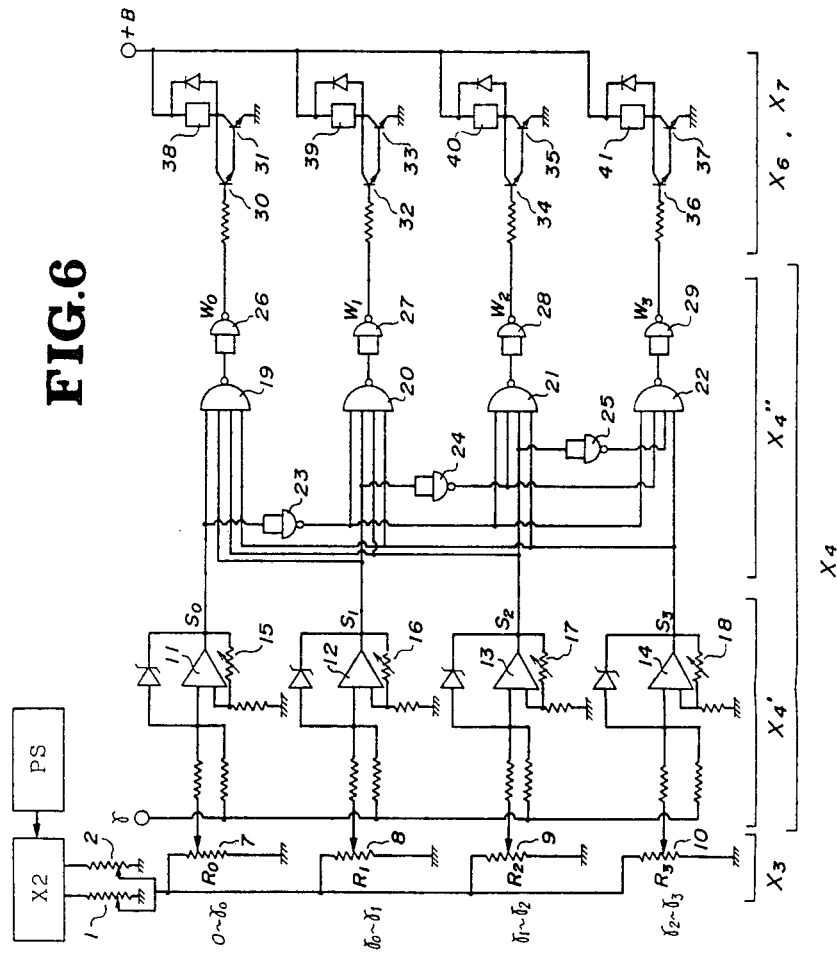
FIG. 6 is a circuit diagram showing another embodiment of the multi-range gear shift.

FIG. 6 is another embodiment similar to that of FIG. 5 in accordance with the present invention. Such corrective changing of power supply will not permit the relation between the ideal speed ratio γ and the actual speed ratio γ* for both of advancing and retracting to be determined to the best one in each gear shift range, however, it provides a very simple composition of the system.

In embodying the present invention, all the variable resistances 1, 2, 7, 7′, 8, 8′, 9, 9′, 10, 10′, 15, 16, 17, & 18 may be replaced with constant resistances if optimum resistance values can be determined.

The same circuit is applicable for advancing and reversing a vehicle in accordance with the present invention by only providing a particular circuit, which changes a setting voltage for advancing and reversing through the advancing/reversing signal, without introducing any modification in conventional compositions of other circuit and system, so that advantages of easy application and controlling an increase in cost are obtainable.

Further, in embodying the present invention, a more accurate control will be accomplished not by utilizing the stepped depth of accelerator pedal but by utilizing a negative pressure in an intake manifold detected by a pressure sensor as a representative of the engine load u.

What is claimed is:

1. In a vehicle in which a power from an internal combustion engine is transmitted through a clutch and a staged geared-transmission to driven wheels, a method for automatic control of a transmission comprising an ideal speed ratio delivered from a speed ratio calculating circuit having simultaneous inputs which relate to vehicle speed and engine load being converted into a stepped actual speed ratio by means of a comparator circuit common to both forward and backward movements, and the actual speed ratio appropriate for the forward movement being given in advancing the vehicle or the actual speed ratio appropriate for the backward movement being given in reversing it by utilizing an advancing/reversing signal judging whether the vehicle is being advanced or reversed on that occasion, and wherein a Schmitt-trigger is used as said comparator circuit, and changing a threshold voltage of the Schmitt-trigger circuit depending on the advancing or reversing of the vehicle, and said method further including supplying an input from an amplification circuit, to said comparator circuit, by switching resistance to provide a maximum power or an economic power.

2. A method for automatic control of a transmission as set forth in claim 1, in which a desired engine rotational speed in relation to an engine load is calculated in said speed ratio calculating circuit which comprises a variable resistor, and a ratio of the desired engine rotational speed to a vehicle speed is made as said ideal speed ratio.

3. A method for automatic control of a transmission as set forth in claim 1 or claim 2, including actuating a control valve in a hydraulic control system through a relay actuating circuit to cause gear shift of the transmission from an output of said comparator circuit.

4. A method for automatic control of a transmission as set forth in claim 2, including providing a gearshift point circuit with an advancing or reversing signal from an advancing variable resistor or a reversing variable resistor, respectively, selected by a gear selector.

5. In a vehicle in which power from an internal combustion engine is transmitted through a clutch and a staged geared-transmission to driven wheels, a device for automatic control of a transmission comprising:
   a speed ratio calculating circuit having simultaneous inputs corresponding to vehicle speed and engine load, said speed ratio calculating circuit being a variable resistor having two inputs and an output;
   a comparator circuit common to both forward and backward movements;
   an advancing/reversing signal circuit judging whether the vehicle is being advanced or reversed, and giving an actual speed ratio appropriate for forward movement in advancing the vehicle and that appropriate for backward movement in reversing it utilizing an advancing/reversing signal when an ideal speed ratio delivered from the speed ratio calculating circuit is converted into a stepped actual speed ratio in the comparator circuit;
   a gearshift point circuit which is operatively connected to said comparator circuit and provides an advancing or reversing signal thereto, from an advancing variable resistor or a reversing variable resistor respectively in response to a gear selector; and
   an amplification circuit which receives the output from the speed ratio calculating circuit and provides an input to said comparator circuit, said amplification circuit includes a switch for switching resistances correspnding to a maximum power or an economic power.

6. A device for automatic control of a transmission as set forth in claim 5, in which said transmission comprises a relay circuit actuated by an output from said comparator circuit and a control valve in a hydraulic control system actuated by an output from the relay actuating circuit, and a power gear shifter is actuated by means of the control valve.

7. A device for automatic control of a transmission as set forth in claim 5 or claim 6, in which a Schmitt trigger circuit changing a threshold voltage depending on advancing or reversing is utilized as said comparator circuit.

8. A device for automatic control of a transmission as set forth in claim 5, further comprising:
   a Schmitt trigger circuit changing a threshold voltage depending on advancing or reversing is utilized as said comparator circuit;
   a current amplification circuit receiving an output from said comparator circuit;
   a relay actuating circuit, receiving an output from said current amplification circuit, including a relay which is actuated by the output from said current amplification circuit; and
   a hydraulic control system including a control valve, actuated by said relay, for actuating a power shifter.

* * * * *